United States Patent
Uro et al.

(10) Patent No.: US 9,077,970 B2
(45) Date of Patent: Jul. 7, 2015

(54) INDEPENDENT LAYERED CONTENT FOR HARDWARE-ACCELERATED MEDIA PLAYBACK

(75) Inventors: Tinic Uro, San Francisco, CA (US); Benoit G Ambry, Fair Oaks, CA (US); Lee B Thomason, Berkeley, CA (US); Sebastian Marketsmueller, San Francisco, CA (US); David A. Tristram, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 907 days.

(21) Appl. No.: 13/035,624

(22) Filed: Feb. 25, 2011

(65) Prior Publication Data

US 2012/0218381 A1 Aug. 30, 2012

(51) Int. Cl.
- *H04N 13/00* (2006.01)
- *H04N 21/426* (2011.01)
- *H04N 21/431* (2011.01)
- *H04N 21/81* (2011.01)

(52) U.S. Cl.
CPC ........... *H04N 13/007* (2013.01); *H04N 13/004* (2013.01); *H04N 21/426* (2013.01); *H04N 21/431* (2013.01); *H04N 21/8146* (2013.01)

(58) Field of Classification Search
CPC . H04N 13/004; H04N 13/007; H04N 21/426; H04N 21/431; H04N 21/8146; H04N 13/0029; H04N 2213/007; G06T 15/503
USPC ............. 348/E13.073, E13.002, 43; 345/629, 345/630
See application file for complete search history.

(56) References Cited

U.S. PATENT DOCUMENTS

| | | |
|---|---|---|
| 7,733,354 B1 | 6/2010 | Mech |
| 2004/0201610 A1* | 10/2004 | Rosen et al. ................. 345/731 |
| 2006/0282855 A1* | 12/2006 | Margulis ....................... 725/43 |
| 2007/0116128 A1 | 5/2007 | Evans et al. |
| 2008/0284798 A1* | 11/2008 | Weybrew et al. ............. 345/630 |
| 2009/0225093 A1* | 9/2009 | Harper et al. ................. 345/522 |

OTHER PUBLICATIONS

Wikipedia via the Internet Archive WayBackMachine, "Video Overlay," 1 page, Feb. 27, 2009, http://en.wikipedia.org/wiki/Video_overlay.
Wikipedia via the Internet Archive WayBackMachine, "Alpha Compositing," 4 pages, Nov. 11, 2009, http://en.wikipedia.org/wiki/Alpha_compositing.
Signes, et al., "MPEG-4's Binary Format for Scene Description," Signal Processing: Image Communication 15 (2000) 321-345.
John Savil, "What is the Desktop Windows manager (DWM)?," Apr. 2, 2007, 3 pages, http://www.windowsitpro.com/article/tips/what-is-the-desktop-windows-manager-dwm-.aspx.
Wikipedia via the Internet Archive WayBackMachine, "Quartz Composer," 5 pages, Feb. 22, 2009.
Apple Developer, "Graphics & Imaging; Quartz Composer," 2 pages, Jul. 1, 2010.

* cited by examiner

*Primary Examiner* — Geepy Pe
*Assistant Examiner* — Dakshesh Parikh
(74) *Attorney, Agent, or Firm* — Wolf-SBMC

(57) ABSTRACT

Presentation of cross-platform multimedia content may be controlled by a media player. Cross-platform content may include a two-dimensional (2D) graphics component, a three-dimensional (3D) graphics component, and a video component. Each component may be rendered as a separate layer, and each component may be rendered independently from one another. The multimedia player may synchronize the separate renderings for presentation. In one embodiment, the rendering of at least one of the separate layers may be performed by a hardware resource separate from the hardware resource executing the multimedia player. Each separate layer may be composited for display. In one embodiment, the compositing may be performed by a hardware resource separate from the hardware resource executing the multimedia player.

24 Claims, 3 Drawing Sheets

INDEPENDENT LAYERED CONTENT FOR HARDWARE-ACCELERATED MEDIA PLAYBACK

BACKGROUND

1. Technical Field

This disclosure relates generally to media playback, and more specifically, to high performance media playback.

2. Description of the Related Art

Media playback engines provide a way to combine, in one presentation, rich media elements such as images, audio, video, two-dimensional (2D) and three-dimensional (3D) vector art, and typography. Some players allow intermixing of media types (e.g., overlapping, processed, and blended elements, etc.). Composition of intermixed elements is typically accomplished by algorithms implemented in software on the platform CPU. CPU composition, however, may be extremely slow and require large amounts of power.

SUMMARY

This disclosure describes techniques and structures that facilitate layering content for high performance media playback. In one embodiment, presentation of cross-platform multimedia content may be controlled by a media player. Cross-platform content may include a two-dimensional (2D) graphics component, a three-dimensional (3D) graphics component, and a video component. Each component may be rendered as a separate layer, and each component may be rendered independently from one another. The multimedia player may synchronize the separate renderings for presentation. In one embodiment, the rendering of at least one of the separate layers may be performed by a hardware resource separate from the hardware resource executing the multimedia player. Each separate layer may be composited for display. In one embodiment, the compositing may be performed by a hardware resource separate from the hardware resource executing the multimedia player.

Figure 1:
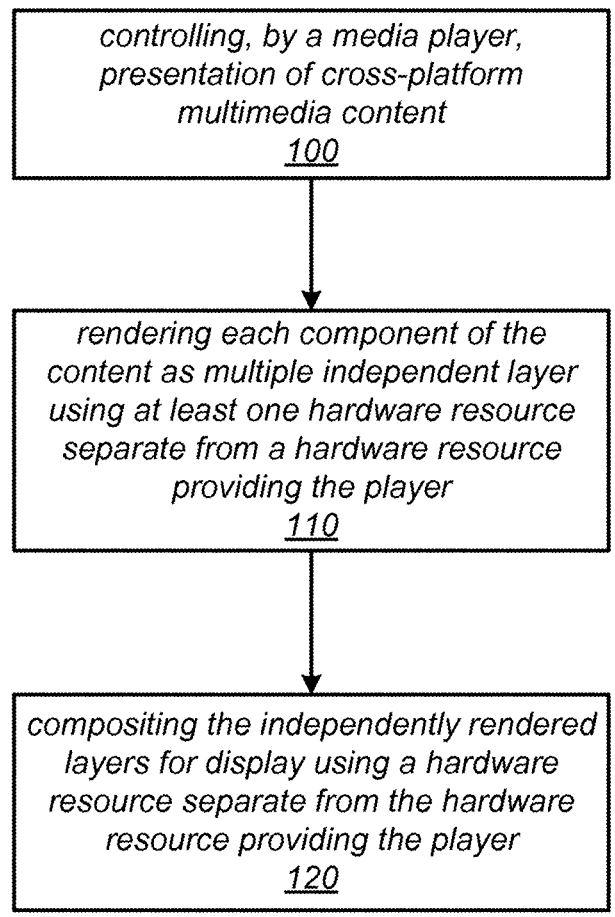
FIG. 1 is a flowchart of layering content for high performance media playback, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Digital image editing applications, executed on a computing device, may be used to manipulate, enhance, transform, create and render images, graphics, and videos, such as vector graphics, 3D graphics, and video. Digital image editing applications may be used to render, modify, and edit such objects, according to various embodiments described herein, and may use an application programming interface (API) such as OpenGL, DirectX, or Direct3D. In some embodiments, APIs may be GPU-programmable and shader-based.

Various embodiments of methods and apparatus for rendering and compositing layered content for high performance rich media playback are described. Some embodiments may include a means for rendering and compositing layered content. For example, one or more rendering modules may receive various content as input and render each type of content independently of the other types in separate layers. A compositing module may composite the layers together at a display time. The rendering and compositing modules may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform receiving various content, rendering each type of content independently of the other types in separate layers, and compositing the layers together at a display time, as described herein. Other embodiments of the rendering and compositing modules may be at least partially implemented by hardware circuitry and/or firmware stored, for example, in a non-volatile memory.

Turning now to FIG. 1, one embodiment for layering content to present media with hardware acceleration is shown. While the blocks are shown in a particular order for ease of understanding, other orders may be used. In some embodiments, the method of FIG. 1 may include additional (or fewer) blocks than shown. Blocks 100-120 may be performed automatically or may receive user input.

As indicated at 100, presentation of cross-platform multimedia content may be performed. In one embodiment, a multimedia player, which may reside on a computing device, may control the presentation. The multimedia player may be executed on a central processing unit (CPU) of the computing device, for example. Multimedia content may be cross-platform in that the content may be platform independent and may not require any specific hardware or protocol to present the content. Cross-platform multimedia content may include: one or more two-dimensional (2D) graphics components, one or more three-dimensional (3D) graphics components, and one or more video components. The 2D graphics component may include vector graphics or bitmap graphics (e.g., RGB pixel data).

As shown at 110, at least some of the components may be independently rendered as separate respective layers. For example, a 2D graphics component, a 3D graphics component, and a video component may each be rendered as a separate layer. In that example, content layers may include a video layer, a 3D vector graphics layer, and a 2D graphics layer. Each component may be rendered independently from one another. Rendered independently in this context means that rendering for each component may come from a separate source, such as a separate hardware resource, and that software composition operations are not performed between layers for different types of content. For example, the multimedia player may be executing on one hardware resource, such as a central processing unit (CPU). One or more 2D graphics components of the presentation may also be rendered on the CPU. One or more 3D graphics components of the same presentation may be rendered on a separate hardware resource, such as a graphics processing unit (GPU). One or more video components of the presentation may be rendered by other separate hardware resources, such as one or more hardware video decoders. A rendered 2D graphics component, a rendered 3D graphics component, and a rendered video component may each be provided as a separate layer to a hardware resource that composites the layers together for display. The hardware resource that composites the layers together for display may be a separate hardware resource than the CPU executing the multimedia player. For example, the layers may be composited for display on a GPU, which may be the same or a different GPU from a GPU rendering the 3D graphics component.

Software composition operations, such as blending, filtering, rotating, etc., may be performed on 2D graphics components in software on a CPU, such as a CPU executing the multimedia player. However, the independently rendered layers for the 3D and video components may be excluded from such operations. This exclusion allows the 3D and video layers to be rendered independently of hardware resources separate from the CPU and avoids copying the rendered 3D and video components into CPU memory to perform software composition operations. By rendering the 3D and video layers independently such that they are excluded from software composition operations on the CPU, presentation of the multimedia content can be assured of taking advantage of hardware acceleration for 3D and/or video components. They independently rendered layers may be sent directly from separate hardware rendering resources to a hardware resource that composites the layers together for display. However, the rendering of each layer still occurs under the control of the multimedia player. In other words, in some embodiments, the rendered 3D and video layers themselves are not operated on by the CPU executing the multimedia player, but their rendering is still directed by the multimedia player such that the overall presentation of the multimedia content is synchronized by the multimedia player. For example, the multimedia player executing on a CPU may cause instructions to be sent to other hardware resources, such as video decoders and GPUs, to trigger or otherwise control the rendering of respective video, 3D, or 2D components. In this way, each layer may still be updated independently with its own timer, i.e., asynchronously. The rendering of the various components may be synchronized, however, by the multimedia player, for presentation.

For example, a multimedia presentation including 2D graphics, 3D graphics and video may be displayed under the control of a multimedia player executing a script for the presentation. The overall timing of the presentation and location of each component in the display of the presentation may be specified in the script and controlled by the multimedia player. In other words, the "when" and "where" for each component may be specified in the script and controlled by the multimedia player. However, one or more of the components may update independently. For example, the video component may be updated at an independent frame-rate under the control of a separate video decoder hardware resource. Similarly, 2D and 3D graphics components may each be updated independently of one another in the same presentation at different rates under the control of respective hardware resources.

Although at least some of the different types of components in the multimedia content may be excluded form software composition operations, all of the components may still participate in an event model of the multimedia player.

In one embodiment, the rendering of at least one of the separate layers may be performed by a hardware resource (e.g., processor, GPU, video decoder, etc.) separate from the hardware resource executing the multimedia player (e.g., CPU). Further, the layering model may allow different hardware components to be used independently, for a given layer, without interacting. In one embodiment, a fixed depth may be defined for the layers for how they are composited. For example, the video layer may be a bottom depth layer, the 3D graphics layer may be an intermediate/middle depth layer, and the 2D graphics layer may be a top depth layer. In one embodiment, one or more layers may be rendered with alpha values for transparency.

In one embodiment, a video layer may include hardware accelerated or hardware decoded video. The video layer may be rendered as a bottom layer for presentation. The video layer, in some embodiments, may be rendered by a dedicated video decoder hardware resource. For example, video may be rendered using a specific hardware video decoding chip or GPU that may drive the video layer completely. This may allow full GPU acceleration of the video, from decoding to presentation. In one embodiment, video content may be encoded using an accelerated codec (e.g. H.264). Using an accelerated codec to encode video may facilitate full GPU acceleration from video decoding to rendering. As a result, read-back (i.e., sending data from GPU to the central processing unit (CPU)) may not be necessary to composite the video frames, as discussed below at block 120. In some embodiments, the hardware decoder may not decode rectangular to rectangular video or video that needs scaling or rotating. For instance, the multimedia player may apply software controlled blending, filtering, or rotation functions on the 2D graphics component. The video component may be excluded from such operations. Moreover, the hardware decoder may further skip operations that would otherwise require use of software in a CPU. In one embodiment, the video component may be pre-rendered before run time or display time. Additionally, the video layer may include multiple video sublayers. In some embodiments, however, only one video of multiple videos may be composited at a time (e.g., on mobile devices). Multimedia content may include more than one video component, each of which may be rendered into its own video layer. Thus, multiple video layers may be rendered. Further, actual video may or may not take up the full video layer. In one embodiment, an API supported by the multimedia player may not present video frames inside the display list but rather inside a texture sitting behind a stage painted through the GPU. This may allow the API to directly paint on screen the content available on the graphics card memory.

In one embodiment, a 3D vector graphics layer may include accelerated or unaccelerated 3D graphics. The 3D graphics layer may be rendered as an intermediate layer, above the video layer and below the 2D graphics layer, for presentation. In some embodiments, hardware may allow the 3D graphics layer to be behind the video layer. In such an embodiment, an API supported by the multimedia player may support placing the 3D graphics layer behind the video layer. Requiring a fixed layer depth order for the different types of multimedia content layers may facilitate taking advantage of using separate hardware resources for the rendering and compositing of such layers. Compositing the layers may not performed in software on a CPU executing the player, but in a separate hardware resource according to the defined fixed depth order for the layers. However, other embodiments having a more advanced hardware resource for layer compositing may support variable layer depth ordering.

Like the video layer, the 3D graphics layer may be rendered using dedicated hardware, such as a 3D graphics card or GPU, instead of software on a CPU. As such, read-back may not be necessary before composition, if at all. In one embodiment, video may not be rendered using the same infrastructure as 3D graphics or 2D graphics. As was the case with video, 3D graphics may or may not take up the full 3D graphics layer. In some embodiments, the 3D graphics layer may be driven dynamically by CPU data at runtime, i.e., the 3D graphics layer may not be pre-rendered. Both the 3D graphics layer and the video layer may use hardware accelerated blitting when available. As was the case with video frames, the API may present the 3D buffer inside a texture sitting behind the stage painted through the GPU. Thus, the video frames and 3D components may not be actual display objects such that rotations, blend modes, filters, and other effects may not be applied in the API. In one embodiment, one or more 3D graphics components may be rendered into one or more 3D graphics layers. In one embodiment, the video layer and/or 3D graphics layer may fail over to be rendered on the CPU using a very fast CPU rasterizer if sufficient separate hardware resources are not available. Accordingly, the multimedia player may detect available hardware on a particular computing device and render the various content components according to available hardware.

In one embodiment, a 2D graphics layer may include regular vector graphics or bitmap graphics, e.g., RGB data, etc. In some embodiments, one or more 2D graphics components may be rendered into one or more separate 2D graphics layers. In other embodiments, all 2D graphics components may be sent to the compositing hardware resource in the same rendered layer. In one embodiment, the 2D graphics layer may be a top layer, above the 3D graphics and video layers. Further, the 2D graphics layer may include alpha values for transparency. In some embodiments, the 2D graphics layer may be a software layer rendering from a CPU software rasterizer. In some embodiments, the 2D graphics layer may be driven dynamically by CPU data at runtime, but rendered on a different hardware resource (e.g., a GPU). In one embodiment, the multimedia player may apply one or more software controlled blending, filtering or rotation functions on the 2D graphics component(s).

In one embodiment, the various content layers may update asynchronously. For example, video content may update at 20 frames per second (fps), while a vector layer (e.g., a subtitle layer) may update every 2 seconds. Updating asynchronously may avoid sync issues by allowing video to play at its own frame rate, be decoded by hardware and presented at an appropriate frame rate while, at the same time, other elements, such as 3D elements, may be updated independently and presented at a higher rate. However, all components are still presented under the direction of the multimedia player such that at a given time t, all layers present a correct or appropriate state (e.g., as defined in a script for the multimedia presentation). Thus, rendering may occur at appropriate independent rates, while the multimedia player may provide a global time control to provide correct overall display of the multimedia presentation.

At 120 in FIG. 1, each separate layer may be composited for display. The compositing may be performed by a hardware resource separate from the hardware resource that executed the multimedia player. For instance, in one embodiment, a central processing unit (CPU) may execute the multimedia player while a graphics processing unit (GPU) may perform the compositing. The plurality of independently rendered layers may be composited together at display time. At that point, the composition may be provided to a display.

Compositing each separate layer for display may include compositing the layers in a fixed order in some embodiments. For example, in one embodiment, a video layer, 3D graphics layer, and 2D graphics layer may be composited from bottom to top, in that order. Composition may be performed, in one embodiment, by a GPU. The GPU may be a dedicated piece of hardware for performing composition of the content layers or compositing may be built-in to a GPU that rendered one of the content layers, for example, the 3D graphics layer. Compositing may be performed with alpha blending from the bottom to the top layer so that the previously independent layers may interact. Having a fixed depth order for the layers may facilitate compositing in a separate hardware resource, such as a GPU, without having to operate on all the layers in the CPU. In one embodiment, at display time, the hardware that rendered the video may feed frame by frame of the video to the GPU to be composited with the other layers. In this manner, video may be flexible by frame rate or by switching between streams. In some embodiments, the GPU may include one or more buffers and other pieces of hardware that perform the blending. In some embodiments, an the blending may be performed as specified via the multimedia player's API. As described above, the layers may be updated asynchronously or independently in terms of rendering. This may allow all layers to be properly displayed regardless of which layer is updated. In some embodiments, the 3D content may take advantage of GPU anti-aliasing as the 3D content is moved to the final display.

The multimedia player may support interaction from a user and other events for the presentation. In one embodiment, an integrated execution environment may be used to control the content layers. The environment may be a scripting environment that receives input and executes a script (e.g., an ActionScript script) to perform an action to one of the layers. Accordingly, the various content components may each participate in an event model of the player. An event may be attached to one of the content layers creating an object that may have elements and corresponding objects in the action script of the programming environment. Input may be received by the integrated execution environment to modify elements (e.g. size, location, etc.) of objects of the 3D graphics layer or video layer. In one embodiment, the video and 3D graphics objects may not take part in composition operations in the script (e.g., filters, blending with other layers, rotations, etc.). 2D graphics objects, however, may have all the modification and composition operations applied to them. In some embodiments, an event may be attached to 3D graphics, which the integrated execution environment may dispatch to respond to the event. Modification events may impact flow of the entire media playback By creating different layers, each layer may be rendered at near native performance of the hardware performing the rendering. Further, rendering the layers independently of the other layers facilitates cross-platform capabilities. High performance rendering may take advantage of hardware acceleration, for example, in a GPU or other dedicated hardware. In doing so, rendering and compositing may not rely as heavily on software, which may result in greater speeds and reduced power usage. Thus, devices with less powerful CPUs but adequate video decoding capabilities (e.g., televisions, set-top boxes, mobile devices, etc.) may render video, including 3D, at higher frame rates.

Figure 2:
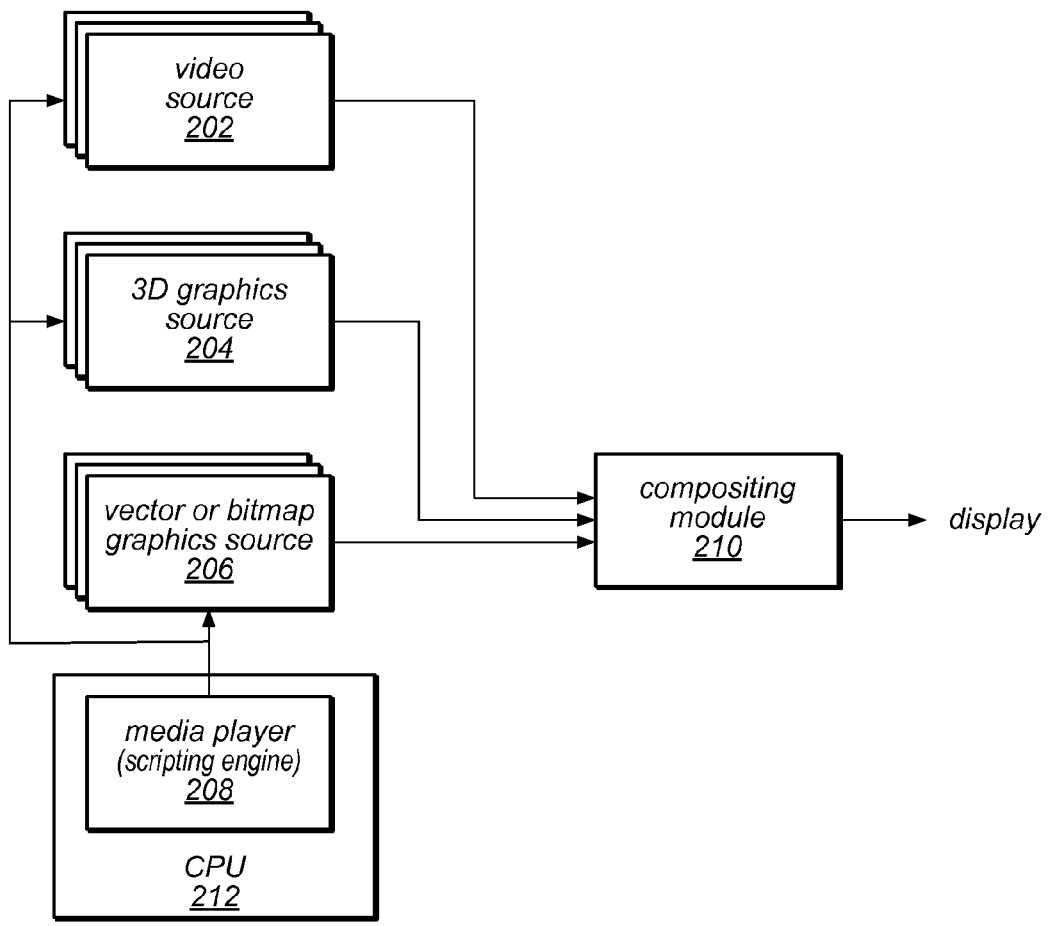
FIG. 2 illustrates a block diagram of one embodiment of layering content for high performance media playback.

FIG. 2 illustrates a block diagram of one embodiment of a system for layering content for high performance media playback. In the illustrated embodiment, different content components may be rendered independently by different hardware resources, such as one or more video sources 202, one or more 3D graphics sources 204, and one or more vector or bitmap graphics sources (2D) 206. The one or more video sources 202 may separate hardware decoder for rendering video components as one or more separate video layers. The one or more 3D graphics sources 204 may be one or more hardware resources, such as one or more GPUs, for rendering 3D graphics components as one or more separate layers. 2D graphics components may be rendered by one or more separate graphics rendering sources 206. Each independently rendered layer may be supplied to a hardware resource including compositing module 210 to composite the layers for display. In some embodiments, the hardware resource including compositing module 210 may be the same hardware resource including one or more of video sources 202, 3D graphics sources 207 and/or 2D graphics sources 206. For example, the layers may be composited in a GPU that also renders one or more 3D or 2D graphics components. Similarly, the one or more vector or bitmap graphics sources 206 include CPU 212, which may also execute the player 208. One or more 2D graphics components may be rendered in different hardware resources, such as a GPU or separate graphics card. CPU 212 may execute multimedia player 208, which may include a scripting engine for controlling the flow of the multimedia presentation. The player 208 may also support an event model for interaction with and between various components of a multimedia presentation. Multimedia player 208 may detect hardware capabilities of the device in which multimedia player 208 and CPU 212 reside. For example, multimedia player 208 may detect a 3D graphics card, a video decoder, a GPU, and a CPU. In such an example, the 2D graphics component may be rendered by the CPU, the 3D graphics component by the 3D graphics card, the video component by the video decoder, and the rendered layers may be composited by the GPU. In another example, multimedia player 208 may detect a GPU and a CPU. The GPU may perform the compositing while the CPU may render some or all of the layers. Or the GPU may perform the compositing and, additionally, render either the video component or 3D graphics component. In general, the player 208 is designed to detect and take advantage of available hardware resources to render as many layers independently for compositing as possible in order to take advantage of as hardware acceleration supported in the given device (e.g., offload rendering and compositing from the CPU).

Figure 3:
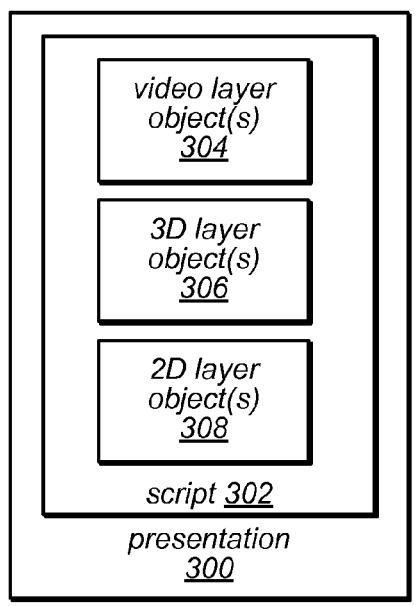
FIG. 3 is a diagram of an event model of the multimedia player, according to some embodiments.

FIG. 3 is a diagram of a multimedia presentation 300 defined using a script 302 that supports APIs for including different types of multimedia content in the presentation, including 2D graphics, 3D graphics and video. The script also takes advantage of an event model of the multimedia player to allow for interaction with and between the different content objects, according to some embodiments. FIG. 3 illustrates a presentation 300 that may include script 302. Script 302 may include one or more video layer objects 304, one or more 3D layer objects 306, and one or more 2D layer objects 308. Each content object, which may be rendered independently as described in FIGS. 1-2, may participate in an event model of the multimedia player. Accordingly, each layer may be represented in script 302 with an object 304-308. In some embodiments, video layer object(s) 304 and 3D layer o bject(s) 306 may participate in the event model, however, they may not take part in operations in script 302, such as filtering, blending with other layers, or rotating. Video layer object(s) 304 and 3D layer object(s) 306 may take part in sizing and positioning operations as well as dispatch to respond to events. 2D layer object(s) 308 may take part in any script 302 operations. Accordingly, script 302 may attach events to various content objects, which may facilitate an overall interactive event model for the system. Events may impact flow of the entire playback of the presentation.

EXAMPLE SYSTEM

Figure 4:
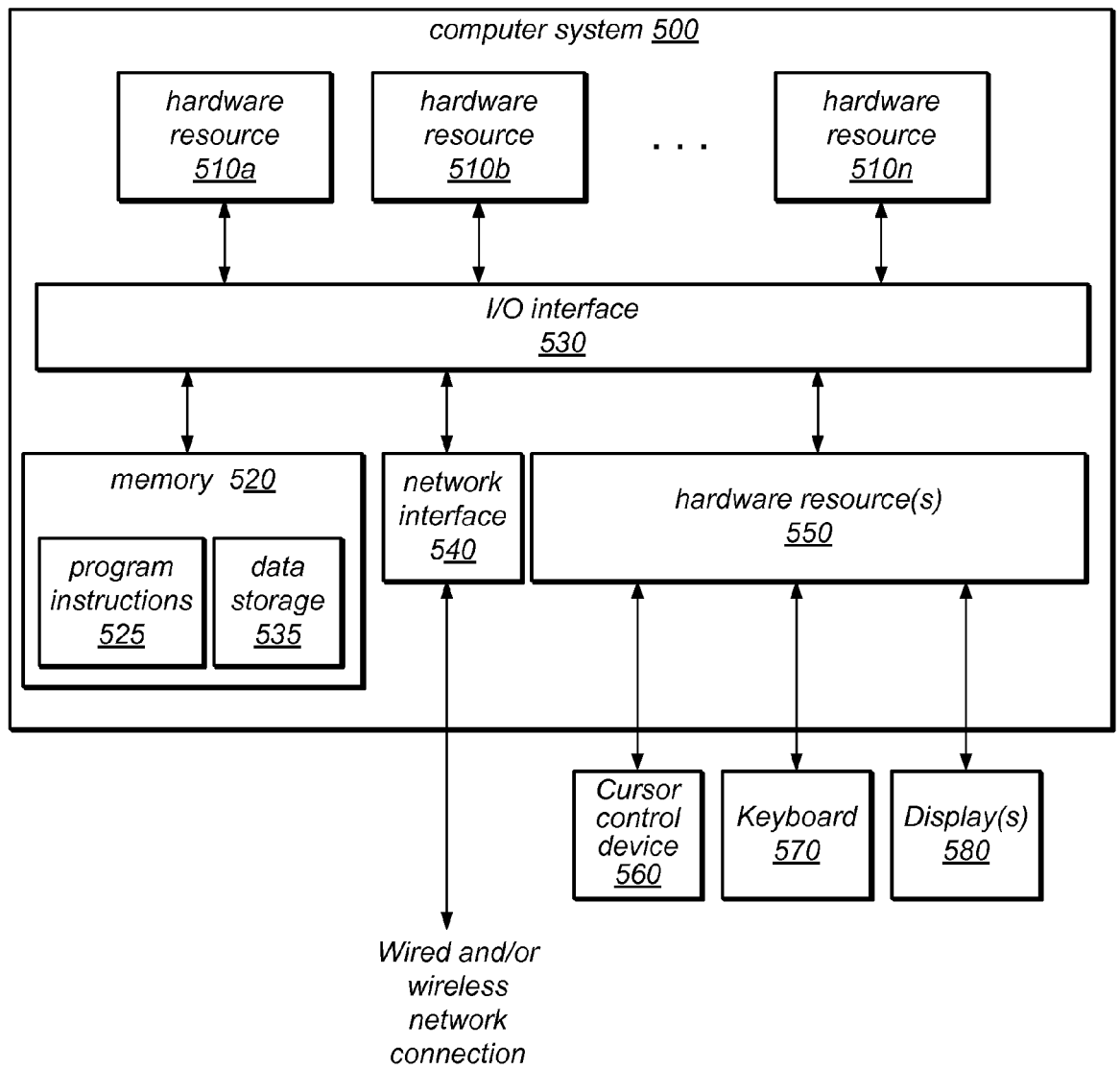
FIG. 4 illustrates an example computer system that may be used in embodiments.

FIG. 4 illustrates a device by which a multimedia player may present a multimedia presentation according to the various rendering and compositing techniques as described herein. The device may interact with various other devices. One such device is a computer system 500, such as illustrated by FIG. 4. In different embodiments, the device may be any of various types of devices, including, but not limited to, a personal computer system, desktop computer, laptop, notebook, or netbook computer, mainframe computer system, handheld computer, workstation, network computer, a camera, a set top box, a mobile device, personal digital assistant, smart phone, a consumer device, video game console, handheld video game device, application server, storage device, a peripheral device such as a switch, modem, router, or in general any type of computing or electronic device.

In the illustrated embodiment, computer system 500 includes one or more hardware resources 510 and 550, at least some of which may be coupled to a system memory 520 via an input/output (I/O) interface 530. Hardware resources 510 and 550 may include one or more processors, such as CPUs and/or GPUs, one or more video decoders, and/or other rendering or compositing hardware. Computer system 500 further includes a network interface 540 coupled to I/O interface 530, and one or more input/output devices, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor, or a multiprocessor system including several processors (e.g., two, four, eight, or another suitable number). Processors may be any suitable processor capable of executing instructions. For example, in various embodiments, processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a GPU. A GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more APIs that permit programmers to invoke the functionality of the GPU(s). Suitable GPUs may be commercially available from vendors such as NVIDIA Corporation, ATI Technologies (AMD), and others.

GPUs, such as one or more of hardware resources 550 may be implemented in a number of different physical forms. For example, GPUs may take the form of a dedicated graphics card, an integrated graphics solution and/or a hybrid solution. The dedicated graphics card may be a 3D graphics card. A GPU may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit and the rest of the computer system 500 may travel through a graphics card slot or other interface, such as I/O interface 530 of FIG. 5.

Note that program instructions 525 may be configured to implement a graphics application (e.g., a multimedia player as described herein) as a stand-alone application, or as a module of another graphics application or graphics library, in various embodiments. For example, in one embodiment program instructions 525 may be configured to implement graphics applications such as painting, editing, publishing, photography, games, animation, and/or other applications, and may be configured to provide the functionality described herein. In another embodiment, program instructions 525 may be configured to implement the techniques described herein in one or more functions or modules provided by another graphics application executed on a GPU and/or other hardware resources 510 or 550 (e.g., a rendering module or a compositing module). These modules may be executable on one or more of CPUs and/or GPUs to cause computer system 500 to provide the functionality described herein. The multimedia player may be implemented in various embodiments using any desired programming language, scripting language, or combination of programming languages and/or scripting languages, e.g., C, C++, C#, Java™, Perl, etc. For example, in one embodiment, the multimedia player may be JAVA based, while in another embodiments, it may be implemented using the C or C++ programming languages. In other embodiments, the multimedia player may be implemented using specific graphic languages specifically for developing programs executed by specialized graphics hardware, such as a GPU. In addition, the multimedia player take advantage of memory specifically allocated for use by graphics processor(s), such as memory on a graphics board including graphics processor(s). Program instructions 525 may also be configured to render images and present them on one or more displays as the output of an operation and/or to store image data in memory 520 and/or an external storage device(s), in various embodiments.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a multimedia player, rendering module(s) and/or compositing module are shown stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-accessible medium may include storage media or memory media such as magnetic or optical media, e.g., disk or CD/DVD-ROM coupled to computer system 500 via I/O interface 530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between a processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., a processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Hardware resource(s) 550 may, in some embodiments, support one or more display terminals, keyboards, keypads, touchpads, scanning devices, voice or optical recognition devices, or any other devices suitable for entering or retrieving data by one or more computer system 500. Multiple input/output devices may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 4, memory 520 may include program instructions 525, configured to implement embodiments as described herein, and data storage 535, comprising various data accessible by program instructions 525. In one embodiment, program instructions 525 may include software elements of embodiments as illustrated in the above Figures. Data storage 535 may include data that may be used in embodiments. In other embodiments, other or different software elements and data may be included.

Those skilled in the art will appreciate that computer system 500 is merely illustrative and is not intended to limit the scope of a rendering module and compositing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, smart phone, tablet computing device, network device, internet appliance, PDA, wireless phones, pagers, a consumer device, video game console, handheld video game device, application server, storage device, a peripheral device such as a switch, modem, router, or in general any type of computing or electronic device. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    controlling, by a multimedia player, presentation of cross-platform multimedia content, the multimedia content comprising a two-dimensional (2D) graphics component, a three-dimensional (3D) graphics component, a video component, a script, and an event model;
    rendering the 2D graphics component, the 3D graphics component, and the video component each as a separate layer;
    the 2D graphics component, the 3D graphics component, and the video component each rendered asynchronously and independently from one another;
    the rendering synchronized by said multimedia player for said presentation; and
    the rendering for at least one of the separate layers performed by a hardware resource separate from a hardware resource executing the multimedia player, one of the plurality of hardware resources being a dedicated video decoder hardware resource and rendering the video component is performed on the dedicated video decoder hardware resource;
    performing first composition operations on the hardware resource executing the multimedia player specified in the script comprising one or more software controlled resizing or translating functions on the 3D and video components and one or more software controlled blending, filtering, or rotation functions on the 2D graphics component according to the event model; and
    performing second composition operations comprising compositing each separate layer for display, the compositing performed by a hardware resource separate from the hardware resource executing the multimedia player.

2. The method of claim 1, wherein said controlling, said rendering and said first and second composition operations are performed on a computer, wherein said multimedia player is executed on a central processing unit (CPU) of the computer and said second composition operations are performed on a graphics processing unit (GPU) of the computer.

3. The method of claim 2, wherein said rendering the 2D graphics component layer is performed on the CPU.

4. The method of claim 2, wherein said rendering the 3D graphics component layer is performed on the GPU.

5. The method of claim 1, wherein the multimedia content comprises more than one 2D graphics component, 3D graphics component, or video component, and wherein each more than one component is independently rendered as another separate layer.

6. The method of claim 1, wherein said second composition operations include compositing the layers in a fixed order.

7. The method of claim 1, wherein the 2D graphics component comprises vector or bitmap graphics.

8. A non-transitory computer-readable storage medium storing program instructions, the program instructions computer-executable to implement a multimedia player for performing operations comprising:
    controlling presentation of cross-platform multimedia content, the multimedia content comprising a two-dimensional (2D) graphics component, a three-dimensional (3D) graphics component, a video component, a script, and an event model;
    directing rendering of the 2D graphics component, the 3D graphics component, and the video component each as a separate layer;
    the 2D graphics component, the 3D graphics component, and the video component each rendered asynchronously and independently from one another;
    and
    the rendering for at least one of the separate layers performed by a hardware resource separate from a hardware resource executing the multimedia player, one of the plurality of hardware resources being a dedicated video decoder hardware resource and rendering the video component is performed on the dedicated video decoder hardware resource;
    the event model of the presentation performing, through execution by the hardware resource executing the multimedia player, first composition operations specified in the script on one or more of the components responsive to an input, the first composition operations comprising one or more software controlled resizing or translating functions on the 3D and video components and applying one or more software controlled blending, filtering or rotation functions on the 2D graphics component, wherein the 3D graphics and video components are excluded from the blending, filtering or rotation functions; and
    directing second composition operations on the layers for display, the second composition operations performed by a hardware resource separate from the hardware resource executing the multimedia player.

9. The non-transitory computer-readable storage medium of claim 8, wherein said multimedia player is executed on a central processing unit (CPU) of a computer and said second composition operations are performed on a graphics processing unit (GPU) of the computer.

10. The non-transitory computer-readable storage medium of claim 9, wherein rendering the 2D graphics component layer is performed on the CPU.

11. The non-transitory computer-readable storage medium of claim 9, wherein rendering the 3D graphics component layer is performed on the GPU.

12. The non-transitory computer-readable storage medium of claim 8, wherein the multimedia content comprises more than one 2D graphics component, 3D graphics component, or video component, and wherein each more than one component is independently rendered as another separate layer.

13. The non-transitory computer-readable storage medium of claim 8, wherein said second composition operations include compositing the layers in a fixed order.

14. The non-transitory computer-readable storage medium of claim 8, wherein the 2D graphics component comprises vector or bitmap graphics.

15. A system, comprising:
a plurality of hardware resources configured to perform operations comprising:
implementing a multimedia player for controlling presentation of cross-platform multimedia content, the multimedia content comprising a two-dimensional (2D) graphics component, a three-dimensional (3D) graphics component, a video component, a script, and an event model;
rendering asynchronously, according to the event model, the 2D graphics component, the 3D graphics component, and the video component each as a separate layer;
the 2D graphics component, the 3D graphics component, and the video component each rendered independently from one another;
the event model performing, through execution of a hardware resource that executes the multimedia player, first composition operations specified in the script on one or more of the components responsive to an input, the first composition operations comprising blending, filtering or rotation functions on the 2D graphics component while excluding the 3D graphics and video components from such operations and one or more software controlled resizing or translating functions on the 3D and video components;
the rendering synchronized, according to the event model, by the multimedia player for the presentation; and
the rendering for at least one of the separate layers performed by a different one of the plurality of hardware resources than the hardware resource that executes the multimedia player, one of the plurality of hardware resources being a dedicated video decoder hardware resource and rendering the video component is performed on the dedicated video decoder hardware resource; and
performing second composition operations on each separate layer for display, the second composition operations performed by a different one of the plurality of hardware resources than the hardware resource that executes the multimedia player.

16. The system of claim 15, wherein one of the plurality of hardware resources is a central processing unit (CPU) configured to execute program instructions to implement said multimedia player, and another one of the plurality of hardware resources is a graphics processing unit (GPU) configured to perform the second composition operations.

17. The system of claim 16, wherein the CPU is further configured to execute program instructions to render the 2D graphics component layer.

18. The system of claim 16, wherein the GPU is configured to render the 3D graphics component layer.

19. The system of claim 15, wherein the multimedia content comprises more than one 2D graphics component, 3D graphics component, or video component, and wherein one or more of the plurality of hardware resources are configured to independently render each more than one component as another separate layer.

20. The system of claim 15, wherein the second composition operations include compositing the layers in a fixed order.

21. The system of claim 15, wherein the 2D graphics component comprises vector or bitmap graphics.

22. The method of claim 1, wherein the multimedia player provides a global time control effective to provide correct overall display of the multimedia presentation.

23. The non-transitory computer-readable storage medium of claim 8, wherein the multimedia player provides a global time control effective to provide correct overall display of the multimedia presentation.

24. The system of claim 15, wherein the multimedia player provides a global time control effective to provide correct overall display of the multimedia presentation.

* * * * *